Patented June 4, 1935

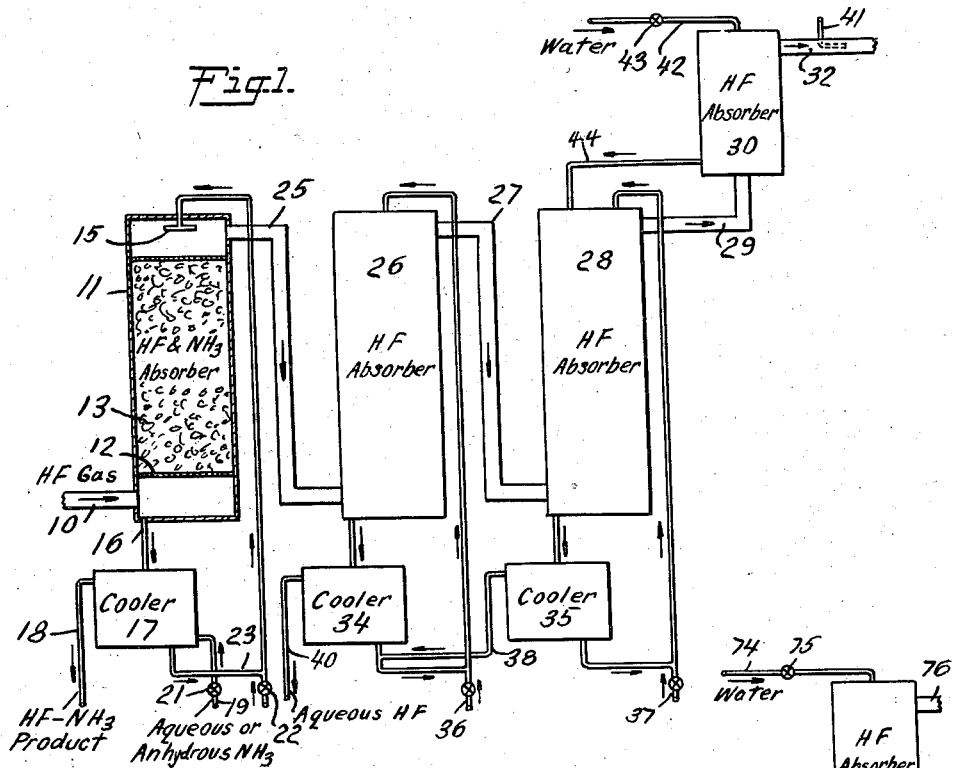
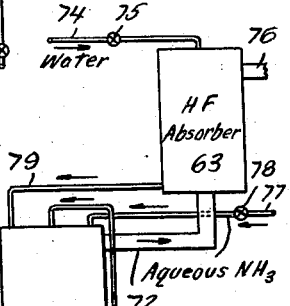
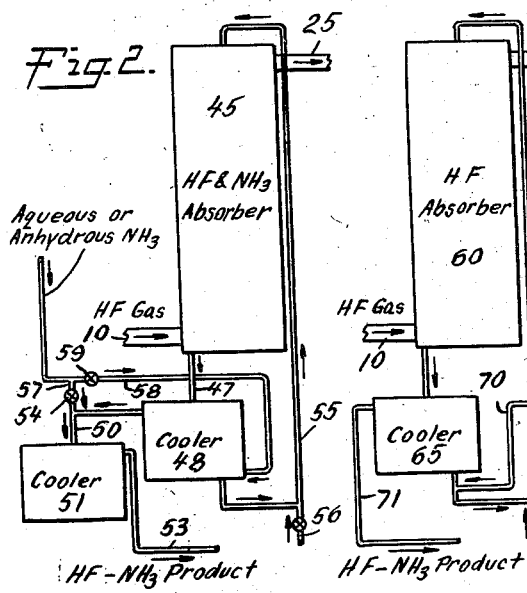

2,003,907

UNITED STATES PATENT OFFICE 2,003,907

MANUFACTURE OF ACID COMPOSITIONS

John V. Shinn, Flushing, and Tom Cummings, Brooklyn, N. Y., assignors to General Chemical Company, New York, N. Y., a corporation of New York Application September 20, 1933, Serial No. 690,226

15 Claims. (Cl. 23—5)

This invention relates to liquid mixtures and/or compounds of hydrofluoric acid and ammonia, and more particularly, the invention is directed to methods for making such products.

In some of the arts, for example in frosting glass, various compositions containing ingredients such as hydrofluoric acid, ammonium bifluoride and other ammonia compounds have been employed. The products made in accordance with the processes of the invention are particularly adapted for use in similar operations.

The principal objects of the present invention lie in the provision of methods for making mixtures and/or compounds of hydrofluoric acid and ammonia which mixtures and/or compounds are liquids at normal temperatures. Another object of the invention is to provide methods which may be easily controlled to produce such liquid products having various ratios of hydrofluoric acid to ammonia. The invention also contemplates, as one of the important objects thereof, the provision of methods by which the desired products may be manufactured from readily available raw materials. It is not known whether the hydrofluoric acid-ammonia products of the invention are compounds or mixtures or various combinations of both. Whatever may be the case, for convenience, the liquid substances formed by the methods of the invention are designated herein as hydrofluoric acid-ammonia compositions.

When carrying out the improved methods of the invention, by bringing hydrofluoric acid and ammonia, preferably ammonia containing liquids, together under conditions insuring the presence of hydrofluoric acid in excess of the amount of hydrofluoric acid required to combine with ammonia to produce ammonium bifluoride, a composition comprising hydrofluoric acid and ammonia is formed which is liquid at normal temperatures.

As is known, when hydrofluoric acid and ammonia are associated, under proper conditions, in proportions by weight of about 70 parts hydrofluoric acid and about 30 parts ammonia, that is, a weight ratio of hydrofluoric acid to ammonia of 70 to 30 or about 2.33, ammonium bifluoride is formed which is a crystalline substance solid at normal temperatures, and usually designated by the formula $NH_4F.HF$. For certain commercial processes, for example in frosting and etching glass, it is desirable to have available mixtures and/or compounds containing hydrofluoric acid and ammonia, which mixtures or compounds are liquid at normal temperatures. It is to the manufacture of such products that the present invention is directed.

By the processes of the invention there may be formed numerous liquid preferably anhydrous products consisting of hydrofluoric acid-ammonia compositions of varying proportions of hydrofluoric acid and ammonia, or aqueous products comprising hydrofluoric acid-ammonia compositions of varying ratios of hydrofluoric acid to ammonia and having any desired concentrations with respect to the hydrofluoric acid-ammonia compositions up to the substantially anhydrous condition.

In accordance with the more desirable methods of carrying out the invention, hydrofluoric acid gas is contacted with an ammoniacal liquor, and preferably a liquor containing hydrofluoric acid-ammonia composition. During the contacting operation, the proportions of hydrofluoric acid and ammonia are maintained such that hydrofluoric acid is present in excess of the amount required to combine with ammonia to form ammonium bifluoride. Under these conditions, a liquid composition of hydrofluoric acid and ammonia is obtained. Contacting the hydrofluoric acid gas and the liquid may be conveniently effected by passing the gas upwardly and flowing the liquid stream downwardly through an absorbing tower, the gas and liquid streams being so controlled that there is present an excess of hydrofluoric acid over the amount needed to combine with ammonia to form ammonium bifluoride. In one modification of the processes constituting the invention, the contacting operation is regulated so that the amount of hydrofluoric acid gas absorbed by the ammonium fluoride liquid in one pass through the tower is such as to form a liquid hydrofluoric acid-ammonia composition having the desired hydrofluoric acid-ammonia ratio. When so proceeding, the effluent liquid of the absorbing tower is finished product of a desired ratio, i. e., above about 2.33. A portion of the liquid is bled out of the system as product of the process, and to the remaining portion, ammonia, aqueous or anhydrous, dependent upon the nature of the product desired, is added, and such remaining portion is then returned to the absorbing tower. The amount of ammonia so added should be controlled so as to maintain the ratio above about 2.33, and to correspond with the quantity of hydrofluoric acid absorbed during the flow of a given amount of liquid through the tower so that the hydrofluoric acid-ammonia ratio of the tower product is maintained substantially constant.

In another modification of the process, the absorbing operation in the tower is so controlled that the liquid product thereof, although having a ratio above about 2.33, contains a greater proportion of hydrofluoric acid than does the desired hydrofluoric acid-ammonia composition. In this procedure, ammonia is added to a portion of the tower product bled off from the system, the amount of ammonia added being such as to offset the excess of hydrofluoric acid in the tower product and provide in the finished product the desired hydrofluoric acid-ammonia ratio. The remaining portion of effluent liquid of the absorbing tower, after the addition of ammonia, is again passed over the tower. Likewise in this instance, the amount of ammonia added to the recycled liquid should be controlled so as to maintain the ratio above about 2.33, but is such that the liquid product of the tower contains an excess of hydrofluoric acid over the amount of hydrofluoric acid contained in the desired finished products, the final hydrofluoric acid-ammonia ratio being adjusted in a subsequent operation.

Operating details, and further advantages and objects of the invention will be appreciated from a consideration of the following description taken in connection with the accompanying drawing showing diagrammatically, in Figures 1, 2 and 3, three types of apparatus which may be used to advantage in carrying out the invention.

Referring to Fig. 1, reference numeral 10 indicates a gas main for introducing hydrofluoric acid gas to the base of an absorbing tower 11. The latter may be of any approved construction, and may comprise a vertically elongated cylindrical vessel having near the base a perforated plate 12 for supporting a body of packing material represented at 13. The top of the tower is provided with a spray head 15 to facilitate distribution of liquid over packing material 13. The liquid product formed in the tower runs through a pipe connection 16 into a cooler 17 from which overflow is withdrawn through pipe 18. Aqueous or anhydrous ammonia, preferably in the form of gas, is fed into cooler 17 at the bottom through a pipe 19 controlled by a valve 21. An air-lift 22 draws liquid from the bottom of cooler 17 through a pipe 23 and raises the liquid to the spray head 15 in the top of the absorbing tower.

Gases not absorbed in tower 11 are discharged from the top, and pass through a pipe 25 into the base of a second absorbing tower 26. Exit gases from the top of absorber 26 flow through gas line 27 into the bottom of a third absorbing tower 28 from the top of which unabsorbed gases are conducted through conduit 29 into the lower end of an absorber 30. Gases not absorbed in the latter are discharged from the apparatus through pipe 32. The absorbers 26 and 28 are of the same construction as tower 11.

Liquid is discharged from absorber 26 into a cooler 34, and liquids from absorber 28 run into a similar cooler 35. Air-lifts 36 and 37 circulate liquid from coolers 34 and 35 over absorbers 26 and 28 respectively, the overflow of cooler 35 running through line 38 into the circulating system of tower 26. The aqueous hydrofluoric acid formed in absorbing towers 26 and 28 is withdrawn as overflow from cooler 34 through pipe 40.

Flow of gas through the absorbing towers from the hydrofluoric acid gas inlet 10 is induced by an air jet 41 in the gas outlet conduit 32 of the absorber 30. Water for absorbing hydrofluoric acid gas passing through towers 26, 28 and 30 is fed into the top of absorber 30 through a pipe 42, having a valve 43, and runs from the bottom of tower 30 into the top of absorber 28 through pipe 44. Tower 30 is packed and constructed similarly to absorbers 26 and 28, except that there is no circulating system operated in conjunction with tower 30.

Referring to Fig. 2, absorber 45 is similar to tower 11 of Fig. 1. The liquid product formed in absorber 45 is discharged from the base through connection 47 into a cooler 48, while overflow from the latter runs through a pipe 50 into a second cooler 51, from the top of which the hydrofluoric acid-ammonia product is withdrawn through pipe 53. Liquid from cooler 48 is recycled over tower 45 by means of pipe 55 and air-lift 56, as in Fig. 1. When operating with the apparatus of Fig. 2, final adjustment of the hydrofluoric acid-ammonia ratio is made in cooler 51, and for this purpose aqueous or anhydrous ammonia may be run into cooler 51 through pipe 57 controlled by valve 54. The ammonia needed in the tower is introduced into the circulating system through a pipe 58 controlled by valve 59. The gas outlet conduit 25 at the top of absorber 45 is connected to the base of a second absorbing tower, corresponding to tower 26 of Fig. 1.

In Fig. 3 is illustrated an apparatus by which aqueous hydrofluoric acid-ammonia compositions may be obtained by contacting hydrofluoric acid gas with an aqueous liquid initially containing only ammonia. The hydrofluoric acid gas from the inlet 10 passes in series through the absorbers 60, 61, 62 and 63 as in the apparatus of Fig. 1. Each of the absorbers 60, 61 and 62 discharges into connecting coolers 65, 66 and 67, and liquid from each cooler is circulated over the associated absorbing tower by air-lifts as in Fig. 1. The overflow of cooler 67 is discharged through pipe 69 into the circulating system of absorbing tower 61, and the overflow of cooler 66 similarly runs through pipe 70 into the circulating system of the first tower 60. The overflow of cooler 65, discharged through pipe 71, constitutes the product of the process.

The gases unabsorbed in tower 62 are conducted by pipe 72 into the bottom of absorber 63 into the top of which water is fed through connection 74 controlled by valve 75. Exit gases of tower 63 are discharged from the apparatus through pipe 76. Aqueous ammonia is introduced into the top of absorbing tower 62 through a line 77, having a control valve 78, and the water from tower 63 runs into the top of tower 62 through pipe 79.

Modifications of the process of the invention may be carried out in the different forms of apparatus described substantially as follows:

In all forms of apparatus, substantially anhydrous hydrofluoric acid gas, obtained for example by the action of sulfuric acid on calcium fluoride, is fed into the base of the absorbing towers 11, 45 and 60 through inlets 10. In each system, the hydrofluoric acid gas stream is caused to flow at a relatively constant rate successively through each series of absorbing towers by the air jet in the gas outlet of the last tower.

The invention contemplates the manufacture of mixtures or compounds of hydrofluoric acid and ammonia which are liquid at normal temperatures. In accordance with the invention, when hydrofluoric acid gas is contacted with ammoniacal liquid or preferably with a liquid containing or comprising hydrofluoric acid and ammonia, and conditions are maintained such that hydrofluoric acid is present during the contacting operation in amounts in excess of the amount of the hydrofluoric acid required to combine with ammonia to form ammonium bifluoride, there is formed the desired hydrofluoric acid-ammonia compositions which are liquid at normal temperatures. In the present methods, in order to produce the desired liquid products, as distinguished from products solid at normal temperatures, there is maintained, during the process of manufacture, an excess of hydrofluoric acid over that required to combine with ammonia to form ammonium bifluoride. Since hydrofluoric acid and ammonia combine in approximately the weight ratio of 70 to 30 to form the solid ammonium bifluoride, in the present process, the presence of hydrofluoric acid is maintained in excess of about 70% by weight. In other words, in the operations of the invention, the ratio of hydrofluoric acid to ammonia is preferably always greater than 70 to 30, or in excess of about 2.33.

It will be understood that products of the invention may be made of aqueous or any concentrations up to the anhydrous condition, in which latter case the product is liquid and consists substantially of hydrofluoric acid and ammonia. Whatever may be the amount of the hydrofluoric acid-ammonia composition contained in a particular liquid product, the hydrofluoric acid-ammonia ratio of the hydrofluoric acid-ammonia composition is in excess of about 2.33 so that the hydrofluoric acid-ammonia compositions contained in the products are in the liquid form at normal temperatures. Accordingly, the liquid products of the processes of the invention, whether hydrous or anhydrous, contain liquid compositions of hydrofluoric acid and ammonia, the hydrofluoric acid-ammonia ratios of which are in excess of about 2.33.

In the modifications of apparatus of Figs. 1 and 2, aqueous or substantially anhydrous hydrofluoric acid-ammonia compositions of varying hydrofluoric acid-ammonia ratios may be conveniently manufactured.

Referring to Fig 1, in starting the operation, cooler 17 is filled with an aqueous solution of hydrofluoric acid, say of 60% strength. The valve in air-lift 22 is opened sufficiently to cause circulation, at the desired rate, of liquid from cooler 17 over tower 11 in a closed circuit including cooler 17, pipe 23, distributor 15, tower 11 and pipe 16. Upward flow of hydrofluoric acid gas through tower 11 is effected by jet 41 in outlet 32 of absorber 30. Valve 21 in pipe 19 is opened, and anhydrous ammonia is continuously fed into the bottom of cooler 17. Circulation of liquid over the absorbing tower is maintained, and the product formed is discharged from the cooler through pipe 18. As circulation of liquid over the tower is continued, the water content of the circulating liquid is gradually decreased, until after a number of passes of the liquid through the tower, a substantially anhydrous product overflows from cooler 17. After this preliminary operation, the purpose of which is to eliminate substantially all of the water contained in the initial aqueous hydrofluoric acid, the circulating system is filled with substantially anhydrous hydrofluoric acid-ammonia composition. Since at all times, the proportions of hydrofluoric acid gas and ammonia are such that hydrofluoric acid is present in excess of the amount required to combine with ammonia to form ammonium bifluoride, none of the latter substance is produced, and the hydrofluoric acid-ammonia compositions are in the liquid condition.

In the usual operation of the apparatus of Fig. 1, the product running out of the tower through pipe 16 is in the finished condition, and has a hydrofluoric acid-ammonia ratio in excess of about 2.33. By controlling the amount of ammonia introduced into the system through pipe 19 and by proper regulation of the circulating system, the liquid running out of the base of tower 11 through pipe 16 has the desired hydrofluoric acid-ammonia ratio, and a portion of such liquid overflows cooler 17 through pipe 18 and constitutes the product of the process. When operating so as to continuously produce in pipe 16 a liquid having a given hydrofluoric acid-ammonia ratio, ammonia is introduced into the bottom of cooler 17 in amount so that the liquor fed into the top of the tower contains an excess of ammonia corresponding to the amount of hydrofluoric acid gas absorbed by the liquor during the subsequent pass through the tower. Such amount is limited however, so that the ratio in the recycled liquid is not reduced below about 2.33.

When it is desired to produce, in the apparatus of Fig. 1, an aqueous liquid, the hydrofluoric acid-ammonia ratio of the hydrofluoric acid-ammonia composition contained in the liquid is adjusted as before by control of the amount of ammonia introduced into the apparatus through pipe 19. Similarly, the water content of the finished products is regulated by water which may be admitted to the system through pipe 19. When making a product which is not anhydrous, aqueous ammonia may be employed and introduced through pipe 19. Furthermore, if conditions should require, both aqueous and anhydrous ammonia may be introduced into the base of cooler 17.

Hydrofluoric acid gas unabsorbed in tower 11 flows through pipe 25 into the base of absorber 26, and then successively through absorbers 28 and 30. Water for absorbing hydrofluoric acid gas in tower 26, 28 and 30 is introduced into the system at the head of absorber 30 through pipe 42, and water from absorber 30, containing relatively small quantities of absorbed hydrofluoric acid, runs by gravity through pipe 44 into the head of absorber 28. Liquid from cooler 35 is circulated through tower 28 by air-lift 37, and the overflow from cooler 35 runs through pipe 38 and thence over tower 26. The amount of water fed into the system through pipe 42 and the circulating systems associated with towers 26 and 28 are preferably so regulated as to produce an aqueous hydrofluoric acid of about 60% concentration which leaves cooler 34 through pipe 40.

In the operation of the apparatus of Fig. 2, the contacting operation in the absorbing tower is so conducted that the liquids leaving the base of the tower through pipe 47 contain hydrofluoric acid in excess of the amount required to combine with ammonia to form the solid ammonium bifluoride, and also in excess of the desired hydrofluoric acid-ammonia ratio of the finished product. The overflow of cooler 48 runs through pipe 50 into cooler 51, and since the liquid hydrofluoric acid-ammonia compositions running out of cooler 48 contain hydrofluoric acid in excess of the desired hydrofluoric acid-ammonia ratio of the finished product, the amounts of ammonia required to correct the hydrofluoric acid-ammonia ratio are introduced into cooler 51 through pipe 57, the quantity of ammonia being controlled by valve 54. The ammonia needed to maintain the proper proportions of hydrofluoric acid and ammonia in absorbing tower 45, under any particular set of operating conditions, is fed into the circulating system through pipe 58. It will be understood that the amount of ammonia added to the circulating system during each pass of a given amount of liquid does not reduce the ratio in the recycled liquor below about 2.33, but is such that the liquid leaving the tower through pipe 47 contains an excess of hydrofluoric acid over the desired ratio of the final product discharged from cooler 51.

In the operation of the apparatus of Fig. 2, aqueous or substantially anhydrous products may be made. If the anhydrous product is desired, anhydrous ammonia is introduced into the system. On the other hand, if an aqueous product is desired, aqueous ammonia may be used in the circulating system, or water and/or aqueous ammonia may be added to the liquid in cooler 51.

The apparatus of Fig. 3 may be employed to advantage in situations where it is desired to obtain only aqueous hydrofluoric acid-ammonia compositions. Aqueous ammonia is fed into the top of the tower 62, rather than into absorber 63, in order to avoid possible losses of ammonia. The relatively small amount of water introduced into the absorber 63 through pipe 74, to insure absorption of substantially all the hydrofluoric acid gas, together with the absorbed hydrofluoric acid runs into the top of tower 62. The water and aqueous ammonia thus introduced into tower 62 flow through the absorbers and associated circulating systems countercurrent to the flow of hydrofluoric acid gas introduced through inlet 10 of tower 60, and aqueous products containing hydrofluoric acid-ammonia compositions are discharged from the last cooler 65 through pipe 71. In conducting operations in the apparatus of Fig. 3, it is to be understood that in the final stages, say in tower 60, conditions are such that there is maintained an excess of hydrofluoric acid over the amount of acid required to combine with ammonia to form the solid ammonium bifluoride. Hence, whatever the water content of the product discharged from the apparatus through pipe 71 may be, the hydrofluoric acid-ammonia compositions contained therein are always in the liquid condition since the ratio of hydrofluoric acid to ammonia is in excess of 2.33.

The water concentration of the final products is dependent upon the amount of water introduced into the system either at the head of tower 63 or as a constituent of the aqueous ammonia fed into tower 62. Preferably, the amount of water run into tower 63 is only that sufficient to absorb traces of hydrofluoric acid gas which may escape from tower 62. The hydrofluoric acid-ammonia ratio of the aqueous products is controlled by the amount of ammonia introduced through pipe 77. At some point in the apparatus, possibly in tower 61 or the associated circulating system, a hydrofluoric acid-ammonia ratio of about 2.33 is reached and ammonium bifluoride may tend to crystallize out. Generally, the temperature in the system is high enough to prevent crystallization of ammonium bifluoride during the relatively brief interval during which the hydrofluoric acid-ammonia ratio is increasing from less than about 2.33 to more than 2.33. If ammonium bifluoride should tend to crystallize out, cooler 66 and the pipe connections of the associated circulating system may be heated externally as may be required to maintain in solution ammonium bifluoride which may momentarily form.

The processes of the invention present numerous operating advantages. Hydrofluoric acid-ammonia compositions, liquid at normal temperatures, and having any desired hydrofluoric acid-ammonia ratio, may be produced. Such compositions may be anhydrous or aqueous as required, and liquid products containing varying amounts of water may be conveniently made. One preferred commercially desirable substantially anhydrous composition having a hydrofluoric acid-ammonia ratio of about 6.14 may be manufactured without difficulty, and the invention particularly contemplates the production of such a product. Operating conditions may be readily controlled. Additionally, the processes are such that the raw materials employed, i. e., hydrofluoric acid gas, and aqueous and anhydrous ammonia are easily and cheaply obtainable. In the appended claims, the term "ammonia" in the expression calling for addition of ammonia to the process liquors is intended to include hydrofluoric acid-ammonia solution having a ratio less than that of the desired product. In all modifications of the invention, when making aqueous products, the liquor introduced into the tops of towers 11, 45 and 60 may be a solution of ammonium bifluoride in water. Hence, in these instances, the hydrofluoric acid-ammonia ratio of the material in solution may be about, and is not preferably less than 2.33.

We claim:

1. The method of making a hydrofluoric acid-ammonia composition which comprises contacting hydrofluoric acid with a liquid containing hydrofluoric acid and ammonia in ratio not less than about 2.33 to form a composition having a higher hydrofluoric acid-ammonia ratio, withdrawing a portion of said composition, adding ammonia to a remaining portion to decrease the hydrofluoric acid-ammonia ratio to not substantially less than about 2.33, and contacting said remaining portion with further quantities of hydrofluoric acid.

2. The method of making a hydrofluoric acid-ammonia composition which comprises contacting hydrofluoric acid with material containing hydrofluoric acid and ammonia in ratio such that the material is liquid at normal temperatures to form a composition having a higher hydrofluoric acid-ammonia ratio, withdrawing a portion of said composition, adding ammonia to a remaining portion to decrease the hydrofluoric acid-ammonia ratio to not substantially less than that at which the composition is liquid at normal temperatures, and contacting the said remaining portion with further quantities of hydrofluoric acid.

3. The method of making a hydrofluoric acid-ammonia composition which comprises contacting hydrofluoric acid with a liquid containing hydrofluoric acid and ammonia in ratio not less than about 2.33 to form a composition having a hydrofluoric acid-ammonia ratio of about 6.14, withdrawing a portion of said composition, adding ammonia to a remaining portion to decrease the hydrofluoric acid-ammonia ratio to not substantially less than about 2.33, and contacting said remaining portion with further quantities of hydrofluoric acid to produce a composition having a hydrofluoric acid-ammonia ratio of about 6.14.

4. The method of making a hydrofluoric acid-ammonia composition which comprises contacting in countercurrent flow relation hydrofluoric acid with a liquid containing hydrofluoric acid and ammonia in ratio not less than about 2.33 to form a composition having a higher hydrofluoric acid-ammonia ratio, withdrawing a portion of said composition, adding ammonia to a remaining portion to decrease the hydrofluoric acid-ammonia ratio to not substantially less than about 2.33, and contacting said remaining portion with further quantities of hydrofluoric acid.

5. The method of making a hydrofluoric acid-ammonia composition which comprises contacting hydrofluoric acid with a liquid containing hydrofluoric acid and ammonia in ratio in excess of about 2.33 to form a composition having a higher hydrofluoric acid-ammonia ratio, withdrawing a portion of said composition, adding ammonia thereto to decrease the hydrofluoric acid-ammonia ratio of said composition, adding ammonia to the remaining portion to decrease the hydrofluoric acid-ammonia ratio to not substantially less than about 2.33, and contacting said remaining portion with further quantities of hydrofluoric acid.

6. The method of making a hydrofluoric acid-ammonia composition which comprises contacting hydrofluoric acid with an anhydrous liquid containing hydrofluoric acid and ammonia while maintaining a hydrofluoric acid-ammonia ratio in excess of 2.33.

7. The method of making a hydrofluoric acid-ammonia composition which comprises contacting hydrofluoric acid with an anhydrous liquid containing hydrofluoric acid and ammonia, and maintaining hydrofluoric acid and ammonia present in such proportions as to form a hydrofluoric acid-ammonia composition liquid at normal temperatures.

8. The method of making a hydrofluoric acid-ammonia composition which comprises contacting hydrofluoric acid with an anhydrous liquid containing hydrofluoric acid-ammonia composition liquid at normal temperatures.

9. The method of making a hydrofluoric acid-ammonia composition which comprises contacting in countercurrent flow relation hydrofluoric acid gas and an anhydrous liquid containing ammonia, and regulating the proportions of hydrofluoric acid and ammonia at the point of first contact of gas with liquid so as to form a hydrofluoric acid-ammonia composition liquid at normal temperatures.

10. The method for making a substantially anhydrous hydrofluoric acid-ammonia composition which comprises contacting substantially anhydrous hydrofluoric acid with a substantially anhydrous material containing hydrofluoric acid and ammonia in ratio such that the material is liquid at normal temperatures to form a substantially anhydrous composition having a higher hydrofluoric acid-ammonia ratio, withdrawing a portion of said composition, adding substantially anhydrous ammonia to a remaining portion to decrease the hydrofluoric acid-ammonia ratio to not substantially less than that at which the composition is liquid at normal temperatures, and contacting the said remaining portion with further quantities of substantially anhydrous hydrofluoric acid.

11. The method of continuously making a hydrofluoric acid-ammonia composition which comprises passing in countercurrent flow relation in a contact zone hydrofluoric acid gas and a liquid stream containing hydrofluoric acid-ammonia having a hydrofluoric acid-ammonia ratio not substantially less than about 2.33, regulating the amount of hydrofluoric acid absorbed in the liquid stream during passage of the latter through the contact zone so as to form a liquid product having a predetermined higher hydrofluoric acid-ammonia ratio, continuously withdrawing liquid product from the contact zone, continuously returning to the contact zone a stream of the liquid product and adding to the liquid returned ammonia in amount to decrease the hydrofluoric acid-ammonia ratio to not less than about 2.33, and sufficient to maintain the predetermined hydrofluoric acid-ammonia ratio at the outlet of the contact zone.

12. The method of continuously making a substantially anhydrous hydrofluoric acid-ammonia composition which comprises passing through a contact zone at a relatively constant rate a stream of hydrofluoric acid gas, passing through the contact zone countercurrent to the flow of hydrofluoric acid gas a stream of substantially anhydrous hydrofluoric acid-ammonia composition having a hydrofluoric acid-ammonia ratio less than about 6.14 but in excess of about 2.33, regulating the amount of hydrofluoric acid absorbed to form a liquid composition having a hydrofluoric acid-ammonia ratio of about 6.14, continuously withdrawing liquid hydrofluoric acid-ammonia composition from the contact zone, continuously returning to the contact zone a portion of the liquid composition, and adding to the liquid so returned anhydrous ammonia in amount to decrease the hydrofluoric acid-ammonia ratio to not less than above about 2.33 and sufficient to maintain a ratio of about 6.14 at the outlet of the contact zone.

13. The method of making a hydrofluoric acid-ammonia composition which comprises passing through a contact zone a stream of hydrofluoric acid gas, passing through the contact zone countercurrent to the flow of hydrofluoric acid gas a liquid containing hydrofluoric acid-ammonia composition, regulating the amount of hydrofluoric acid gas absorbed during passage of the liquid through the contact zone so as to form a hydrofluoric acid-ammonia composition having a hydrofluoric acid-ammonia ratio higher than the desired ratio of finished product, withdrawing liquid from the contact zone, adding ammonia to a portion of the liquid and returning the same to the contact zone, and adding to another portion of the liquid ammonia in amount sufficient to reduce the hydrofluoric acid-ammonia ratio to the desired amount.

14. The method of making a substantially anhydrous hydrofluoric acid-ammonia composition which comprises contacting substantially anhydrous hydrofluoric acid with a substantially anhydrous liquid containing hydrofluoric acid and ammonia while maintaining a hydrofluoric acid-ammonia ratio in excess of 2.33.

15. The method of making a substantially anhydrous hydrofluoric acid-ammonia composition which comprises contacting substantially anhydrous hydrofluoric acid with a substantially anhydrous liquid containing hydrofluoric acid-ammonia composition liquid at normal temperatures.

JOHN V. SHINN.
TOM CUMMINGS.